US012741257B2

(12) United States Patent
Zimmermann et al.

(10) Patent No.: US 12,741,257 B2
(45) Date of Patent: Sep. 22, 2026

(54) GRANULATE PRODUCTION DEVICE AND METHOD FOR CONTROLLING AND/OR REGULATING THE GRANULATE PRODUCTION DEVICE

(71) Applicant: Glatt Gesellschaft mit beschränkter Haftung, Binzen (DE)

(72) Inventors: Dirk Zimmermann, Wehr (DE); Jochen Thies, Lörrach (DE)

(73) Assignee: Glatt Gesellschaft mit beschränkter Haftung, Binzen (DE)

( * ) Notice: Subject to any disclaimer, the term of this patent is extended or adjusted under 35 U.S.C. 154(b) by 0 days.

(21) Appl. No.: 19/103,654

(22) PCT Filed: Aug. 14, 2023

(86) PCT No.: PCT/EP2023/072406
§ 371 (c)(1),
(2) Date: Feb. 13, 2025

(87) PCT Pub. No.: WO2024/038024
PCT Pub. Date: Feb. 22, 2024

(65) Prior Publication Data
US 2026/0048373 A1 Feb. 19, 2026

(30) Foreign Application Priority Data
Aug. 15, 2022 (DE) .................... 10 2022 120 526.6

(51) Int. Cl.
*B01J 2/16* (2006.01)
*B07B 7/06* (2006.01)

(52) U.S. Cl.
CPC .. *B01J 2/16* (2013.01); *B07B 7/06* (2013.01)

(58) Field of Classification Search
CPC ...... B01J 2/10; B01J 2/16; B07B 7/06; B07B 11/02; B07B 11/04
(Continued)

(56) References Cited

U.S. PATENT DOCUMENTS 9,631,869 B2 * 4/2017 Shimono .............. F27D 3/0033
11,642,700 B2 5/2023 Thies et al.
(Continued)

FOREIGN PATENT DOCUMENTS

CH 686343 A5 * 3/1996 ................ B01J 8/26
DE 10230321 A1 1/2004
(Continued)

OTHER PUBLICATIONS

Schade; Andreas, "Particulate Bulk Solid Drying" (English Translation), Mar. 15, 1996, worldwide.espacenet.com (Year: 1996).*

*Primary Examiner* — Molly K Devine
(74) *Attorney, Agent, or Firm* — The Webb Law Firm

(57) ABSTRACT

A granulate production device and methods for open-loop and/or closed-loop control of the granulate production device. The granulate production device includes a granulator, a screening device connected to the granulator via a granulate feed line, a processing apparatus which is connected to a screen product chamber of the screening device via a granulate transfer line, and a measuring device which is suitable for detecting a physical parameter of a transfer gas. The transfer gas can be conveyed by a conveyor device arrangement on a transfer gas conveyor path extending from a feed line inlet to a transfer line outlet. The measuring device is suitable for detecting a physical parameter of the transfer gas selected from flow rate, mass flow, and flow velocity on the transfer gas conveyor path.

19 Claims, 5 Drawing Sheets

(58) Field of Classification Search
USPC ............................................ 209/2, 250, 256
See application file for complete search history.

(56) References Cited

U.S. PATENT DOCUMENTS

| | | | | |
|---|---|---|---|---|
| 2001/0043848 | A1* | 11/2001 | Boos .......................... | B01J 2/16<br>414/21 |
| 2008/0111269 | A1 | 5/2008 | Politi et al. | |
| 2008/0203200 | A1 | 8/2008 | Waldron et al. | |
| 2018/0325828 | A1* | 11/2018 | Thies .................. | A61K 9/1682 |
| 2020/0316647 | A1* | 10/2020 | Thies ...................... | B07B 1/469 |

FOREIGN PATENT DOCUMENTS

| | | | |
|---|---|---|---|
| DE | 102014112154 | A1 | 3/2016 |
| DE | 102017221731 | A1 | 6/2019 |
| JP | 2003315268 | A | 11/2003 |
| JP | 2015190752 | A | 11/2015 |
| WO | 2019105700 | A2 | 6/2019 |

* cited by examiner

AS
AS
PG
PG

GRANULATE PRODUCTION DEVICE AND METHOD FOR CONTROLLING AND/OR REGULATING THE GRANULATE PRODUCTION DEVICE

CROSS-REFERENCE TO RELATED APPLICATIONS

This application is the United States national phase of International Patent Application No. PCT/EP2023/072406 filed Aug. 14, 2023, and claims priority to German Patent Application No. 10 2022 120 526.6 filed Aug. 15, 2022, the disclosures of which are hereby incorporated by reference in their entireties.

BACKGROUND

Field

The invention relates to a granulate production device, having a granulator comprising an agitator driven by an agitator drive unit, which granulator has at least one granulator inlet for feeding the raw materials, having a screening device connected to the granulator via a granulate feed line, which screening device comprises a screen chamber confined by a screen housing, which screen chamber is subdivided by a screen into a granulate chamber for receiving the granules discharged from the granulator and a screen product chamber for receiving the screened granules, the screen product chamber being connected to a transfer gas feed line comprising a feed line inlet, and with a processing apparatus which is connected to the screen product chamber of the screening device via a granulate transfer line comprising a transfer line outlet and which comprises a processing chamber through which a process gas conveyed by a conveyor device arrangement can flow on a processing path from a processing chamber to a processing chamber outlet, and wherein a transfer gas can be conveyed by the conveyor device arrangement on a transfer gas conveyor path extending from the feed line inlet to the transfer line outlet, which is further suitable for conveying the screened granules by means of the transfer gas via the granulate transfer line from the screen product chamber of the screening device into the processing chamber of the processing apparatus.

Furthermore, the invention relates to a method for open-loop and/or closed-loop control a granulate production device, having a granulator comprising an agitator driven by an agitator drive unit, which granulator has at least one granulator inlet for feeding the raw materials, having a screening device connected to the granulator via a granulate feed line, which screening device comprises a screen chamber confined by a screen housing, which screen chamber is subdivided by a screen into a granulate chamber for receiving the granules discharged from the granulator and a screen product chamber for receiving the screened granules, the screen product chamber being connected to a transfer gas feed line comprising a feed line inlet, and with a processing apparatus which is connected to the screen product chamber of the screening device via a granulate transfer line comprising a transfer line outlet and which comprises a processing chamber through which a process gas conveyed by a conveyor device arrangement flows on a processing path from a processing chamber to a processing chamber outlet, and wherein a transfer gas is conveyed by the conveyor device arrangement on a transfer gas conveyor path extending from the feed line inlet to the transfer line outlet, which is further suitable for conveying the screened granules by means of the transfer gas via the granulate transfer line from the screen product chamber of the screening device into the processing chamber of the processing apparatus.

Description of Related Art

Granulate production devices are already known from the state of the art.

WO 2019/105700 A2 discloses a screening device arranged between a granulator and a processing apparatus in the form of a fluidized-bed dryer for screening granules, in particular wet or dry granules, the screening device comprising a screen housing comprising a screen bottom, a screen cover and a sidewall, a granulate feed line arranged on the screen housing, a granulate transfer line for the screened granules, arranged on the screen housing, and a screen arranged in the screen housing, as well as a transfer gas feed line.

SUMMARY

The disadvantage of the granulate production device disclosed in the prior art is that the granulate transfer line connecting the screen housing of the screening device and the processing apparatus designed as a fluidized-bed dryer becomes at least partially blocked during the granulate transfer process and, due to the necessary cleaning of the granulate transfer line, the granulate transfer process and thus a granulate production process for the maintenance of the granulate production device must be interrupted. The objective of the invention is to provide a granulate production device and a method for open-loop and/or closed-loop control the granulate production device that does not require the interruption of the granulate transfer process and the associated granulate production process.

In a device of the type mentioned above, this task is solved by the granulate production device comprising a measuring device, which is suitable for detecting a physical parameter of the transfer gas selected from the group consisting of flow rate, mass flow and flow velocity on the transfer gas conveyor path. By detecting the physical parameter selected from the group consisting of flow rate, mass flow and volume flow on the transfer gas conveyor path, detailed information about clogging of the granulate transfer line is determined, which can be used to continuously clean the granulate transfer line during the granulate transfer process before clogging occurs, so that it is not necessary to interrupt the granulate production process.

Transfer and/or process gases are gaseous media, primarily air but also inert gases.

A corresponding improvement of the granulate production device the measuring device comprises a meter for detecting the physical parameter of the transfer gas at the transfer gas conveyor path, expediently at a transfer gas conveyor line portion associated with the transfer gas feed line. The meter is preferably designed as a thermal mass flow meter, a Coriolis flow meter, an electromagnetic flow meter, an ultrasonic flow meter, a vortex flow meter, a differential pressure meter or a flow monitor. The flow sensor SI5000 from ifm electronic gmbh or similar is used as a flow monitor, for example. The arrangement of the measuring device designed as a meter makes it very easy to measure the physical parameter selected from the group consisting of flow rate, mass flow or flow velocity at the transfer gas conveyor path. Ideally, the meter is located on a transfer gas conveyor line portion assigned to the transfer gas feed line, since the corresponding measurement of the physical parameter of the transfer gas can be carried out here without great effort due to the transfer gas flow not being loaded with granules.

According to an additional advantageous embodiment of the granulate production device, the granulator is designed as a mixing granulator. Mixing granulators, in particular high-shear mixers, have been used for wet granulation for decades in the pharmaceutical industry, among others. Today, the robust and reliable mixing granulators, which are usually designed as vertical granulators, are setting new standards in the pharmaceutical granulation process. They are the first choice when a high granule density and fast granulation are important in the granulation process. In addition, they require relatively little space, are easy to operate and are easy to clean. The granulation process is the production of the granules, which begins with the feeding of the raw materials and ends with the emptying of the granulator.

In this regard, the agitator drive unit is advantageous in that it comprises a substantially constant drive torque over its speed range. This allows the granulate properties, in particular the granulate particle size, to be manipulated and directly set during the granulation process in the granulator. The provision of a uniformly high drive torque by the agitator drive unit over its speed range makes it possible to adjust the shear forces, which are proportional to the speed n of the agitator drive unit, during the granulation process in such a way that the granulate properties can be set directly. In this context, the drive torque is the physical parameter that produces torsion or curvature of a drive shaft of the agitator drive unit, for example. It is the product of force [N] and lever arm [m], provided that the force and the lever arm are perpendicular to each other. The drive torque has a unit of energy [1 Nm (Newton meter)]. The drive torque of the drive shaft driving the agitator is proportional to the power output of the agitator drive unit coupled to the drive shaft, namely $P=2\pi M n$ with M as drive torque [Nm], n as speed [1/s], P as power [W] and $\pi$ as the circle number.

According to a further development of the granulate production device, a screen body is arranged in the granulate chamber of the screening device in order to convey the granules from the granulate chamber through the screen into the screen product chamber, the screen body being expediently drivable by a screen body drive unit designed as a motor. The advantage of the screen body arranged in the screen housing is that it can be used to press the granules through the screen more effectively. The screen body thus optimizes the screening process taking place in the screening device. The screen body arranged in the granulate chamber is expediently adapted to a granulate chamber design, further improving the screening process, since the granules are pressed through the screen under continuous and constant pressure by means of the screen body adapted to the shape of the screen. The screening process refers to the sieving of the granules in the granulate chamber.

Moreover, a rotor disk is preferably arranged in the screen product chamber of the screening device, which can be expediently driven by a rotor disk drive unit designed as a motor. The rotor disk is particularly preferably arranged in an area of the screen product chamber floor. The advantage of a rotor disk arranged in the screen product chamber in the area of a screen product chamber floor is that the screened granules do not remain on the screen product chamber floor, but are instead completely discharged from the screen product chamber in the direction of the processing apparatus.

According to an additional advantageous embodiment of the granulate production device, the transfer gas feed line is arranged tangentially in particular on a sidewall of the screen housing. As a result of the tangential arrangement of the transfer gas feed line on a sidewall of the screen housing, expediently in the area of the screen product chamber floor, centrifugal forces act on the screened granules, in particular in the screen product chamber, which forces them upwards away from the screen product chamber floor, so that the screened granules can be discharged better from the screen product chamber in the direction of the processing apparatus. This is further enhanced by a cylindrical, at least partially conical design of the screening device. In this regard, the granulate transfer line is preferably arranged above the transfer gas feed line on the screen housing.

According to an additional advantageous embodiment of the granulate production device, the granulate transfer line is arranged in particular tangentially on a sidewall of the screen housing. With the granulate transfer line arranged in this way, the screened granules can be discharged more easily from the screen product chamber in the direction of the processing apparatus, in particular when the transfer gas feed line is also arranged tangentially on the sidewall of the screen housing.

In addition, the transfer gas feed line comprises a filter assembly at a feed line inlet, which is expediently designed as a HEPA filter. HEPA filters are the ultimate solution for the mechanical cleaning of transfer gas, in particular transfer air, drawn in from the environment. HEPA usually stands for "High Efficiency Particulate Air". The filter assembly and the corresponding cleaning of the transfer gas ensure that the sieved granules remain uncontaminated.

Preferably, the transfer gas feed line is connected to a process gas feed line so that the transfer gas is process gas. This ensures that the transfer gas comprises the same properties as the process gas processing the screened granules in the processing apparatus.

After an additional advantageous improvement of the granulate production device, the processing apparatus is designed as a coating apparatus or as a fluidizing apparatus. The design of the processing apparatus as a coating apparatus makes it possible to coat the screened granules directly, for example with a protective layer. The design as a fluidizing apparatus, in particular as a fluidized bed apparatus or spouted bed apparatus, also offers the possibility of further processing the screened granules conveyed from the screen product chamber into the processing apparatus and of producing and coating preferably spherical granules with a precisely defined granule particle size.

Furthermore, the conveyor device arrangement comprises a process gas conveyor device and/or a transfer gas conveyor device. In this regard, the process gas conveyor device is advantageously arranged in a process gas feed line upstream of the processing apparatus and/or a process gas exhaust line downstream of the processing apparatus. The transfer gas conveyor device is expediently arranged in the transfer gas feed line. In the preferred embodiment, the conveyor device arrangement is designed as a process gas conveyor device and is arranged downstream in the process gas exhaust line. This makes it possible to generate a vacuum on the transfer gas conveyor path, which conveys the screened granules from the screen product chamber via the granulate transfer line into the processing apparatus for further processing.

In accordance with a further training of the granulate production device, the granulate production device comprises a control device which expediently comprises a closed loop control functionality and which, taking into account the detected physical parameter of the transfer gas, controls the granulator. In this regard, the control device controls the agitator drive unit and/or a granulator outlet closing device. The control device is configured in an expedient manner in order to set a speed of the agitator drive unit and/or to open or close the granulator outlet closing device. By means of open-loop and/or closed-loop control of the granulate production device, in particular the agitator drive unit and/or the granulator outlet closing device, the granulate production process can be subdivided into partial processes, in particular those conducted in batches, such as the granulation process, granulate transfer process and granulate processing process. In this context, the granule production process refers to the entire manufacturing process, from the feeding of the raw materials to the discharge of the processed granules from the processing apparatus.

The granulate transfer process refers to the transfer of the granulate from the screen product chamber to the processing apparatus, while the granulate processing process refers to the processing of the screened granulate conveyed into the processing apparatus, which ends with the discharge of the processed granulate.

After an additional advantageous improvement of the granulate production device, the processing apparatus comprises an apparatus inlet closing device, in which, in particular, the control device open-loop and/or closed-loop controls the apparatus inlet closing device. By means of open-loop and/or closed-loop control of the apparatus inlet closing device, which is in particular designed as a flap, the processing chamber of the processing apparatus is closed with respect to the granulate transfer line, so that the process gas flows exclusively through the processing apparatus in order to maintain the granulate processing process. In a processing apparatus designed as a fluidizing apparatus, this ensures sufficient fluidization of the screened granules for the granulate processing process.

In addition, the processing apparatus preferably comprises a process gas feed line in which a process gas flow control device is arranged, wherein the control device expediently open-loop and/or closed-loop controls the process gas flow control device. The pressure drop occurring over the processing apparatus can advantageously be adjusted by means of the process gas flow control device. In particular, the process gas flow control device is used in the case when the apparatus inlet closing device is open for the granulate transfer process, in order to generate a vacuum at the transfer gas conveyor path and expediently to set it precisely.

Furthermore, the granulate production device preferably comprises a plurality of processing apparatuses and a plurality of granulate transfer lines, wherein each processing apparatus is connected to the screening device by means of a granulate transfer line in order to achieve a quasi-continuous granulate production process. This makes it possible to multiply the quantity of granules produced in a given period of time, thus reducing production costs.

Furthermore, in a method of the type mentioned at the beginning, the objective is solved by the granulate production device comprising a measuring device which, during a granulate transfer process, detects a physical parameter of the transfer gas selected from the group consisting of flow rate, mass flow or flow velocity on the transfer gas conveyor path. By detecting the physical parameter selected from the group consisting of flow rate, mass flow rate and volume flow rate on the transfer gas conveyor path, detailed information about clogging of the granulate transfer line is determined, which can be used to continuously clean the granulate transfer line during the granulate transfer process before clogging occurs, thus avoiding the need to interrupt the granulate production process.

In this regard, the method is preferably carried out as a batch process. According to a particularly preferred method, the granulate production device comprises a plurality of processing apparatuses and a plurality of granulate transfer lines, wherein each processing apparatus is connected to a granulate transfer line on the screening device in order to conduct a quasi-continuous granulate production process. By connecting a plurality of processing apparatuses to the screening device by means of a plurality of granulate transfer lines, it is possible to change the batchwise granulate production process into a quasi-continuous granulate production process. In this process, the control device feeds the processing apparatus with screened granules one after the other in order to produce granules quasi-continuously by means of the plurality of processing apparatus. Furthermore, this makes it possible to multiply the quantity of granules produced in a given period of time, thus reducing production costs.

In an additionally advantageously improved method, the granulate production device comprises a control device expediently comprising a closed loop control functionality, to which the detected physical parameter is forwarded for further processing, expediently during the granulate transfer process. In this regard, the control device comprises an evaluation device which, taking into account the detected physical parameter of the transfer gas, carries out further processing of the detected physical parameter of the transfer gas.

After an additional advantageous improvement of the method, the processing apparatus comprises an apparatus inlet closing device, wherein the control device, prior to the granulate transfer process, open-loop and/or closed-loop controls the apparatus inlet closing device so that it is moved from a closing position into an opening position.

After an additional advantageous improvement of the method, the processing apparatus comprises a process gas feed line, in which a process gas flow control device is arranged, the control device open-loop and/or closed-loop controls the process gas flow control device before and/or during the granulate transfer process, so that a vacuum is formed on the transfer gas conveyor path for conveying the screened granules from the screen product chamber into the processing apparatus.

According to an additional advantageous improvement of the method the control device carries out a comparison with a first threshold value stored in the control device for the physical parameter during the further processing of the detected physical parameter of the transfer gas in order to open-loop and/or closed-loop control the granulate production device wherein the control device sends an open-loop and/or closed-loop signal to an agitator drive unit and/or granulator outlet closing device in order to set a speed of the agitator drive unit and/or to open or close the granulator outlet closing device. In this regard, upon falling below the threshold for the transport gas, the agitator drive unit is stopped and/or a granulator outlet closing device is closed. Preferably, the speed of the agitator drive unit increases continuously over time during the granulate transfer process. Furthermore, during the further processing of the detected physical parameter of the transfer gas, the control device carries out a comparison with a second threshold value for the physical parameter stored in the control device, wherein, upon exceeding a second threshold value for the transfer gas, the agitator drive unit is started and/or a granulator outlet closing device is opened. The constant and continuous control of the physical parameters of the flow rate, mass flow or flow speed by the control device ensures that neither the screen arranged in the screen housing of the screening device nor the granulate transfer line become clogged or, in the worst case, blocked, so that the granulate production process has to be interrupted. It is also advantageous if an interruption time is stored in the control device, after which the agitator drive unit is started and/or a granulator outlet closing device is opened.

Preferably, before or during a granulate transfer process, at least one granulator inlet for feeding the raw materials is closed so that no false air can enter the granulate production device.

BRIEF DESCRIPTION OF THE DRAWINGS

The terms Fig., Figs., Figure, and Figures are used interchangeably in the specification to refer to the corresponding figures in the drawings.

The invention is explained in more detail below, with reference to the accompanying drawings, in which.

DETAILED DESCRIPTION

Figure 2:
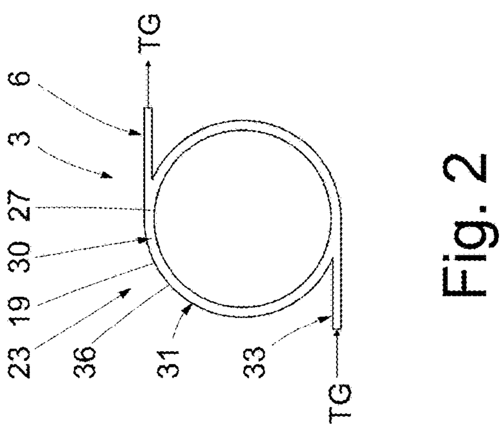
FIG. 2 shows a schematic illustration of a screen product chamber of the screening device of a granulate production device.

The following description refers to all of the embodiments of a preferred granulate production device 1 illustrated in the drawing, unless otherwise stated.

The granulate production device 1 comprises a granulator 2, a screening device 3 and a processing apparatus 4, the granulator 2 being connected to the screening device 3 by means of a granulate feed line 5 and the screening device 3 being connected to the processing apparatus 4 by means of a granulate transfer line 6. Expediently, the granulate production device 1 additionally comprises a control device 7 having a closed-loop control functionality for controlling the granulation production device 1, the control device 7 preferably comprising an evaluation device 61 and/or a database 65.

The granulator 2, preferably designed as a mixing granulator 66, comprises at least one granulator inlet 8 for feeding the raw materials AS. The raw materials AS are all materials to be fed to the granulator for granulation during the granulation process, in particular various excipients, active ingredients, fillers, colorants, dissolving agents and granulating liquid.

Figure 1:
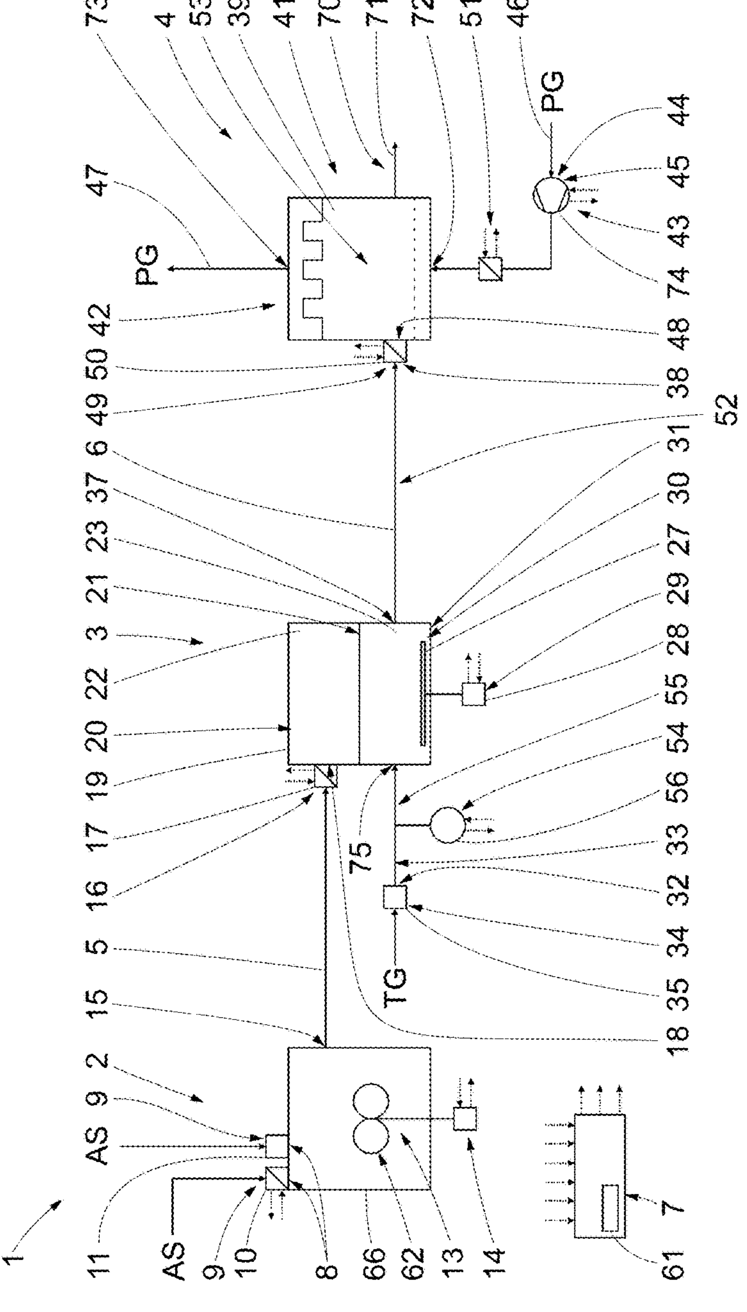
FIG. 1 shows a schematic illustration of a first embodiment of the granulate production device.

Each granulator inlet 8 is expediently openable or closable by a granulator inlet closing device 9, wherein the granulator inlet closing device 9 is designed in particular as a granulator inlet closing flap 10 or as a granulator inlet cover 11. In an embodiment not shown, the granulator inlet closing device 9 is in the form of a granulator inlet valve. The granulator inlet closing device 9 can be arranged on the granulator 2 or in a raw material feed line 12. In the embodiment of FIG. 1, the two granulator inlet closing devices 9 are arranged on the granulator 2, in the embodiments of FIGS. 3 and 4, the two granulator inlet closing devices 9 are each arranged in a raw material feed line 12. In addition, the granulator inlet closing device 9 is expediently designed to send open-loop and/or closed-loop signals to the control device 7 and/or receive open-loop and/or closed-loop signals from it for its open-loop and/or closed-loop control. The open-loop and/or closed-loop signals are shown as short dashed arrows.

The raw materials AS can be granulated by means of an agitator 13 arranged in the granulator 2 which comprises an agitator rotor 62, wherein the agitator rotor 62 of the agitator 13 can be driven by an agitator drive unit 14, and wherein the agitator drive unit 14 preferably has a substantially constant drive torque over its speed range. For this purpose, the agitator drive unit 14 is preferably designed as a torque or electric motor. The agitator drive unit 14 is expediently designed to send open-loop and/or closed-loop signals to the control device 7 and/or to receive open-loop and/or closed-loop signals from it for its open-loop and/or closed-loop control. The open-loop and/or closed-loop signals are shown as short dashed arrows. The control device 7 is configured to set a speed n of the agitator drive unit 14, expediently to stop the agitator drive unit 14, so that the agitator 13 comes to a standstill and no granules are discharged from the granulator 2.

Furthermore, the granulator 2 comprises a granulator outlet 15. The granulator outlet 15 optionally comprises a granulator outlet closing device 16, which is expediently designed as a granulator outlet closing flap 17. The granulator outlet closing device 16 can be arranged on the granulator outlet 15, in the granulate feed line 5 or on the screening device 3. In the embodiment of FIG. 4, the granulator outlet closing device 16 is arranged on the granulator 2, in the embodiments of FIGS. 1 and 3, the granulator outlet closing device 16 is arranged on the screening device 3. The granulator outlet closing device 16 is expediently designed to send open-loop and/or closed-loop signals to the control device 7 and/or to receive open-loop and/or closed-loop signals from the latter for its open-loop and/or closed-loop control. The open-loop and/or closed-loop signals are shown as short dashed arrows. The control device 7 is configured to open or close the granulator outlet closing device 16.

The granulate feed line 5 connects the granulator 2 to the screening device 3 via the granulator outlet 15 and a screen device granulate inlet 18.

The screening device 3 comprises a screen chamber 20 confined by a screen housing 19, which is subdivided by a screen 21 into a granulate chamber 22 for receiving the granules discharged from the granulator 2 and a screen product chamber 23 for receiving the screened granules. A screen body 24 is preferably arranged in the granulate chamber 22 of the screening device 3 in order to convey the granules from the granulate chamber 22 through the screen 21 into the screen product chamber 23, wherein the screen body 24 is expediently drivable by a screen body drive unit 26 configured as a motor 25, and the motor 25 is preferably a torque or electric motor. The screen body drive unit 26 is expediently designed to send open-loop and/or closed-loop signals to the control device 7 and/or receive open-loop and/or closed-loop signals from it for its open-loop and/or closed-loop control. The open-loop and/or closed-loop signals are shown as short dashed arrows.

Figure 3:
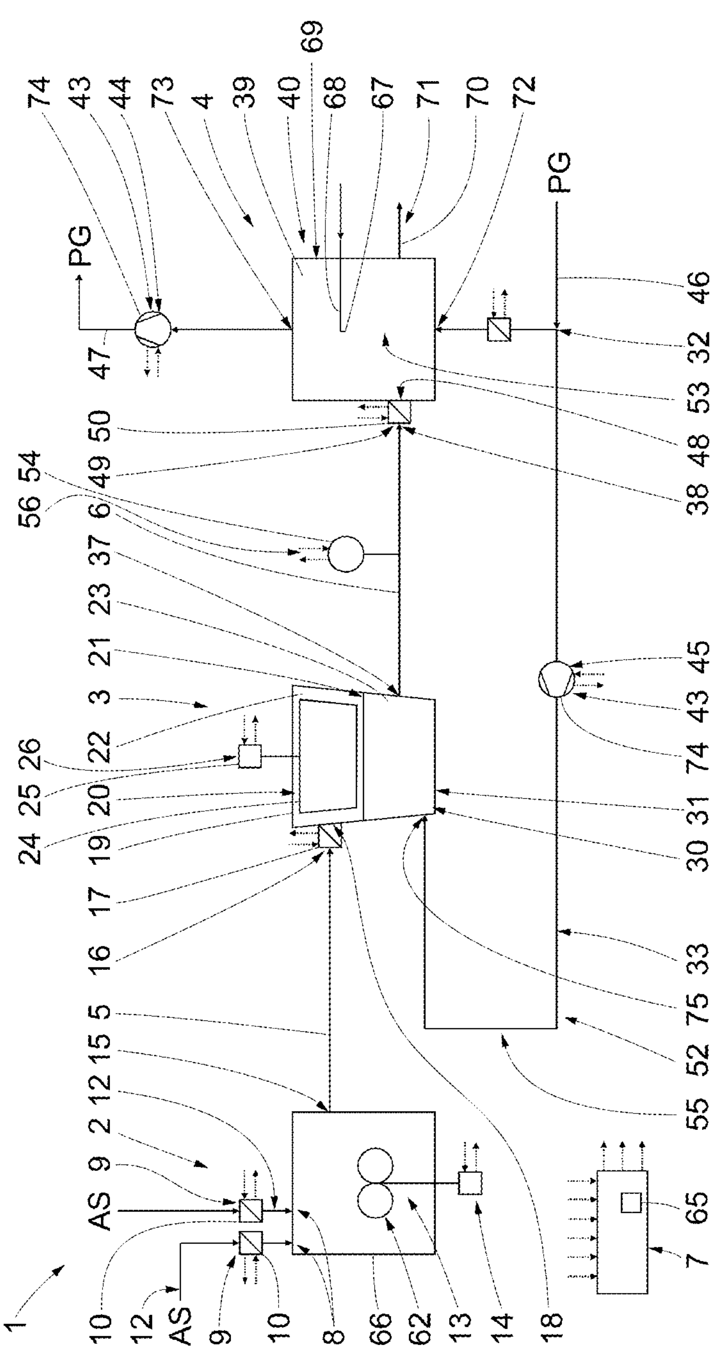
FIG. 3 shows a schematic illustration of a second embodiment of the granulate production device.
Figure 4:
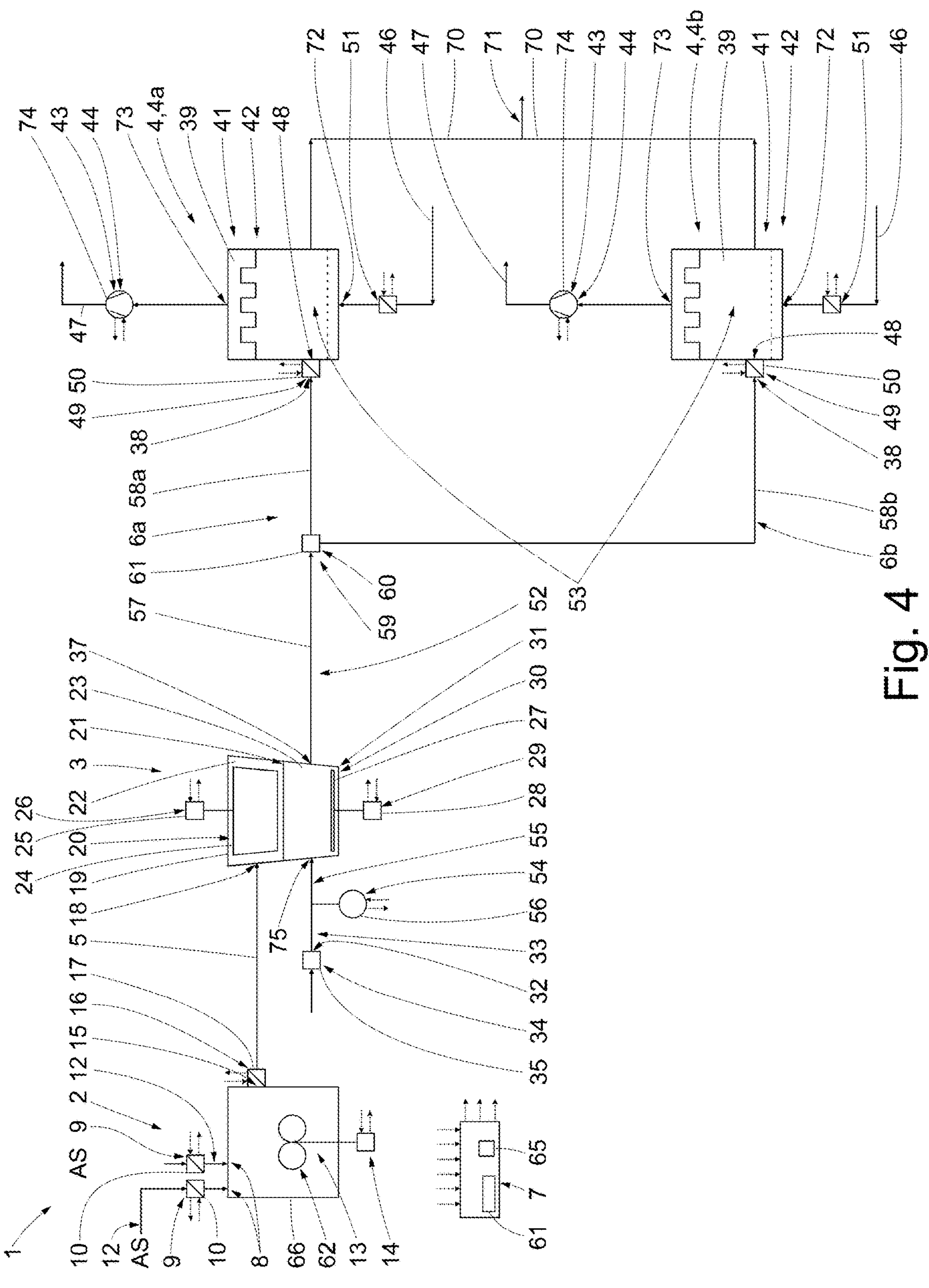
FIG. 4 shows a schematic illustration of a third embodiment of the granulate production device, FIG. 5 a first schematic diagram of the agitator rotor speed and the physical parameter flow velocity, each over time, and FIG. 6 a second schematic diagram of the agitator rotor speed and the physical parameter flow velocity, each over time.

In the embodiment of FIG. 1, no screen body 24 is arranged in the granulate chamber 22 of the screening device 3; in the embodiments of FIGS. 3 and 4, a screen body 24 is arranged in the granulate chamber 22.

A rotor disk 27 is preferably arranged in the screen product chamber 23 of the screening device 3, which can be expediently driven by a rotor disk drive unit 29 designed as a motor 28. The rotor disk 27 is arranged in particular in an area 30 of a screen product chamber floor 31. The motor 28 is preferably designed as a torque motor or an electric motor. The rotor disk drive unit 29 is expediently designed to send open-loop and/or closed-loop signals to the control device 7 and/or receive open-loop and/or closed-loop signals from it for its open-loop and/or closed-loop control. The open-loop and/or closed-loop signals are shown as short dashed arrows.

In the embodiment of FIG. 3, no rotor disk 27 is arranged in the screen product chamber 23, wherein in the embodiments of FIGS. 1 and 4, a rotor disk 27 is arranged in the screen product chamber 23.

A transfer gas feed line 33 comprising a feed line inlet 32 is connected to the screen product chamber 23 via a transfer gas inlet 75, wherein a filter assembly 34 is arranged at the feed line inlet 32 for the case that ambient air is sucked in as transfer gas TG via the transfer gas feed line 33, which filter assembly 34 is expediently designed as a HEPA filter 35.

As shown schematically in FIG. 2, the transfer gas feed line 33 is preferably arranged in particular tangentially on a sidewall 36 of the screen housing 19. Feeding transfer gas TG improves the transfer of the screened granules from the screen product chamber 23 into the processing apparatus 4. In addition, a gas flow is generated in the screen housing 19 of the screening device 3, which minimizes or completely prevents the adhesion or deposition of granules on the inner surface of the screen housing 19. In particular, a preferably lateral, but particularly preferably tangential, arrangement of the transfer gas feed line 33 on the screen housing 19 produces very good flow conditions for the transfer gas TG in the screen housing 19 to prevent the adhesion or deposition of granules in the granulate transfer line 6.

In addition, the screen product chamber 23 of the screening device 3 is connected to a processing apparatus inlet 48 of the processing apparatus 4 by means of a screen product outlet 37 and a granulate transfer line 6 comprising a transfer line outlet 38. The granulate transfer line is also arranged, as also shown in FIG. 2, in particular tangentially on a sidewall 36 of the screen housing 19 of the screen product chamber 23 of the screening device 3. The granulate transfer line 6 is preferably arranged at the same height as the transfer gas feed line 33 on the screen housing 19, as shown in FIGS. 1 and 4. In the embodiment of FIG. 3, the granulate transfer line 6 is arranged above the transfer gas feed line 33 on the screen housing 19.

The processing apparatus 4 comprising a processing chamber 39 is expediently designed as a coating apparatus 40 comprising a spraying device 68 having a spray nozzle 67, in particular as a drum coater 69, or as a fluidizing apparatus 41. The fluidizing apparatus 40, in turn, is in particular a fluidized bed apparatus 42 or a spouted bed apparatus realized in an embodiment not shown.

The processing chamber 39 is passed through by a process gas PG conveyed by a conveyor device arrangement 43 on a processing path 53 from a processing chamber inlet 72 to a processing chamber outlet 73. In a fluidizing apparatus 41, the screened granules conveyed by the transfer gas TG into the processing chamber 39 of the processing apparatus 4 are fluidized by the process gas PG and thus, for example, further processed during drying and/or coating. The processed granules are discharged from the processing apparatus 4 via a discharge device 71 comprising a granulate outlet line 70. As shown in the embodiment of FIG. 4, the two fluidizing apparatuses 41 of the granulate production device 1 comprise a common granulate outlet line 71.

In addition, a transfer gas TG can be conveyed through the conveyor device arrangement 43 on a transfer gas conveyor path 52 extending from the feed line inlet 32 to the transfer line outlet 38, wherein the transfer gas TG is suitable, during the granulate transfer process, for conveying the screened granules via the granulate transfer line 6 out of the screen product chamber 23 of the screening device 3 and into the processing chamber 39 of the processing apparatus 4.

Accordingly, the conveyor device arrangement 43 comprises a process gas conveyor device 44 and/or a transfer gas conveyor device 45, the process gas conveyor device 44 being arranged in a process gas feed line 46 upstream of the processing apparatus 4, as shown in FIG. 1, and/or in a process gas exhaust line 47 downstream of the processing apparatus 4, as shown in FIG. 4. The process gas conveyor device 44 and/or the transfer gas conveyor device 45 are preferably designed as blowers 74. If present, the transfer gas conveyor device 45 is particularly preferably arranged in the transfer gas feed line 33, as shown in the embodiment of FIG. 1. In the most preferred embodiment, the granulate production device 1 comprises only a process gas conveyor device 44 arranged in the process gas exhaust line 47 downstream of the processing apparatus 4, as shown in the embodiment of FIG. 4.

In the embodiment shown in FIG. 3, the transfer gas feed line 33 is connected to a process gas feed line 46 so that the process gas PG is used as the transfer gas TG. This is advantageous because the screened granules come into contact exclusively with process gas during the granule production process.

Furthermore, the processing apparatus 4 comprises an apparatus inlet closing device 49 for the processing apparatus inlet 48. The processing apparatus inlet 48 is expediently openable or closable by means of an apparatus inlet closing device 49, the apparatus inlet closing device 49 being designed in particular as an apparatus inlet closing flap 50. In an embodiment not shown, the apparatus inlet closing device 49 is in the form of an apparatus inlet valve.

The apparatus inlet closing device 49 can be arranged on the processing apparatus 4 or in a granulate transfer line 6, with an arrangement on the processing apparatus 4 being the preferred embodiment. In each of the embodiments shown, the apparatus inlet closing device 49 is arranged on the processing apparatus 4. In addition, the apparatus inlet closing device 49 is expediently designed to send open-loop and/or closed-loop signals to the control device 7 and/or receive open-loop and/or closed-loop signals from it for its open-loop and/or closed-loop control. The open-loop and/or closed-loop signals are shown as short dashed arrows.

A process gas flow control device 51 is expediently arranged in the process gas feed line 46 of the processing apparatus 4 for adjusting the pressure loss occurring over the processing apparatus 4. The process gas flow control device 51 is expediently designed to send open-loop and/or closed-loop signals to the control device 7 and/or receive open-loop and/or closed-loop signals from it for its open-loop and/or closed-loop control. The open-loop and/or closed-loop signals are shown as short dashed arrows.

Finally, the granulation production device 1 comprises a measuring device 54 that is suitable for detecting a physical parameter of the transfer gas TG selected from the group consisting of flow rate, mass flow or flow velocity $v_{TG}$ on the transfer gas conveyor path 52. The measuring device 54 is expediently associated with the screening device 3. Preferably, as shown in FIGS. 1 and 4, the measuring device 54 is arranged on a transfer gas conveyor line portion 55 associated with the transfer gas feed line 33. In FIG. 3, the measuring device 54 is arranged in the granulate transfer line 6.

The measuring device 54 is expediently designed as a meter 56 for recording the physical parameter of the transfer gas TG at the transfer gas conveyor path 52. The meter 56 is preferably a thermal mass flow meter, a Coriolis flow meter, an electromagnetic flow meter, an ultrasonic flow meter, a vortex flow meter, a differential pressure meter or a flow monitor that outputs a Boolean signal, such as the flow sensor SI5000 from ifm electronic gmbh.

One particularly preferred embodiment of the granulate production device 1 among the embodiments shown is shown in FIG. 4. The granulation production device 1 shown in FIG. 4 comprises a plurality of processing apparatuses 4*a* and 4*b* and a plurality of granulate transfer lines 6, each processing apparatus 4 being connected to the screening device 3 by means of a granulate transfer line 6 in order to achieve a quasi-continuous granulate production process. One granulate transfer line 6 of FIG. 4 forms two granulate transfer lines 6*a* and 6*b*. Each of the two granulate transfer lines 6*a* and 6*b* comprises a first, common granulate transfer line portion 57 and a second granulate transfer line portion 58, each of which is associated with only one processing apparatus 4. A switching arrangement 60, such as a switchable flap system 61, is arranged at a connection point 59 between the first granulate transfer line portion 57 and the respective second granulate transfer line portion 58*a* or 58*b*, which is suitable for switching the granulate transfer line 6*a* and 6*b* in such a way that either the processing apparatus 4*a* or 4*b* is fed with screened granules for further processing via its corresponding granulate transfer line 6*a* or 6*b*. In an embodiment not shown, the plurality of granulate transfer lines 6 are designed to be completely separate from one another and do not comprise a common granulate transfer line portion 57.

In a further embodiment not shown, the granulate production device 1 comprises three, four, five, six or more processing apparatuses 4.

The method for open-loop and/or closed-loop control a granulate production device 1 is conducted with the following steps, among others, whereby the order of the steps cannot be considered as a chronological order. The steps can be conducted in any order and, if necessary, at the same time.

- Starting the conveyor device arrangement 43 to convey process gas PG through the processing path 53;
- setting the process gas flow control device 51 to generate a vacuum on the transfer gas conveyor path 52 for conveying the screened granules from the screen product chamber 23 into the processing apparatus 4, expediently before and/or during the granulate transfer process;
- detecting the physical parameter of the transfer gas TG selected from the group consisting of flow rate, mass flow and flow velocity $v_{TG}$ on the transfer gas conveyor path 52;
- forwarding the detected physical parameter to the control device 7 for further processing, expediently during the granulate transfer process;
- further processing of the detected physical parameter of the transfer gas by the control device 7, for example, storage, evaluation or the like;
- evaluation, in particular comparison, with a threshold value 63, of the physical parameter of the transfer gas TG, which is detected on the transfer gas conveyor path 43, selected from the group consisting of flow rate, mass flow rate and flow velocity $v_{TG}$ in the evaluation device 61 of the control device 7;
- opening each granulator inlet closing device 9 for feeding the raw materials AS
- Filling granulator 2 with raw materials AS via the at least one granulator inlet 8 and producing granules;
- closing the at least one granulator inlet 8 for feeding the raw materials AS, in particular each granulator inlet closing device 9, before or during a granulate transfer process, so that no false air can enter the granulate production device;
- discharge of the granules produced in the granulator 2 into the screening device 3, in particular by means of an agitator 13;
- open-loop and/or closed-loop control of the agitator 13 by means of the agitator drive unit 14;
- open-loop and/or closed-loop control of the granulator outlet closing device 16;
- screening of the granules in the screening device 3;
- transfer of the screened granules from the screen product chamber 23 into the treatment apparatus 4;
- closing the apparatus inlet closing device 49 when the screened granules have been transferred from the screen product chamber 23 into the processing apparatus 4;
- processing the screened granules in the processing apparatus 4;
- discharging the granules processed in the processing apparatus 4 via the discharge device 71;
- opening the apparatus inlet closing device 49 when the processed granules have been transferred from the processing apparatus after a granulate processing process from the screen product chamber 23 into the processing apparatus 4 or when a new batch is to be processed;
- repeating the above steps in any order.

A granulator production process is now explained in more detail using the embodiment of FIG. 1 as an example.

In a first step, the conveyor device arrangement 43, designed as a process gas conveyor device 44, is activated so that process gas PG is conveyed through the processing apparatus on the processing path 53. In this case, the process gas conveyor device 44 is a blower 74.

At the same time, each granulator inlet closing device 9 for feeding the raw materials AS is opened and the granulator outlet closing device 16 is closed. The granulator 2 is then filled with raw materials AS via the at least one granulator inlet 8 and granules are produced.

While the granules are being produced in the granulator 2, a process gas flow through the processing apparatus is set by means of the process gas flow control device 51. By opening the apparatus inlet closing device 49, a vacuum is generated on the transfer gas conveyor path 52 for conveying the screened granules from the screen product chamber 23 into the processing apparatus 4, so that ambient air is sucked in as transfer gas via the filter assembly 34. The physical parameter of the transfer gas TG, namely the flow velocity $v_{TG}$, is detected on the transfer gas conveyor path 52 and forwarded to the control device 7 for further processing.

After that, both granulator inlets 8 for feeding the raw materials AS, in particular each granulator inlet closing device 9, are closed so that no false air can enter the granulate production device.

After that, the granulator outlet closing device 16 is opened and the granules are conveyed out of the granulator 2 and into the screening device 3 by means of the agitator rotor 62. There the granules are screened and then conveyed as screened granules by means of transfer gas via the granulate transfer line 6 into the processing apparatus 4. Before and during the granulate transfer process, the detected physical parameter of the transfer gas is evaluated by the control device 7. For this purpose, the detected physical parameter of the transfer gas is compared in the evaluation device 61 with a first threshold 63 stored in the control device. As soon as the threshold 63 is dropped below, an open-loop and/or closed-loop signal is sent to the agitator drive unit 14, which stops the agitator drive unit 14. The granules conveyed into the screening device 3 are conveyed further into the processing apparatus 4 as screened granules. Since no more granules are being conveyed out of the granulator 2, the quantity of screened granules on the transfer gas conveyor path 52, in particular in the screening device 3 and the granulate transfer line 6, decreases and the flow rate $v_{TG}$ of the transfer gas TG increases again.

After a predefined interruption time 64 stored in the database 65 of the control device 7, the agitator drive unit 14 receives an open-loop and/or closed-loop signal again and begins again to discharge the granules produced from the granulator 2. This sequence of steps is repeated until the granulator 2 is completely emptied.

The control device 7 then sends an open-loop and/or closed-loop signal to each granulator inlet closing device 9 for feeding the raw materials AS and to the granulator outlet closing device 16 for closing the same. The granulator 2 is then refilled with raw materials AS via the at least one granulator inlet 8 and granules are produced. The steps following the production of granules in the granulator 2 are also repeated.

The control device 7 sends a control signal to the apparatus inlet closing device 49 to close it. The screened granules conveyed into the processing apparatus 4 are further processed in the processing apparatus 4 after the apparatus inlet closing device 49 has been closed, for example by coating by means of the spraying device 68, and are discharged via the discharge device 71 after their treatment. Both the spraying device 68 and the discharge device 71 receive the necessary open-loop and/or closed-loop signals from the control device 7 for this purpose.

This batch-based granule production process is then repeated as often as necessary until the required quantity of granules has been produced by granulate production device 1.

Figure 5:
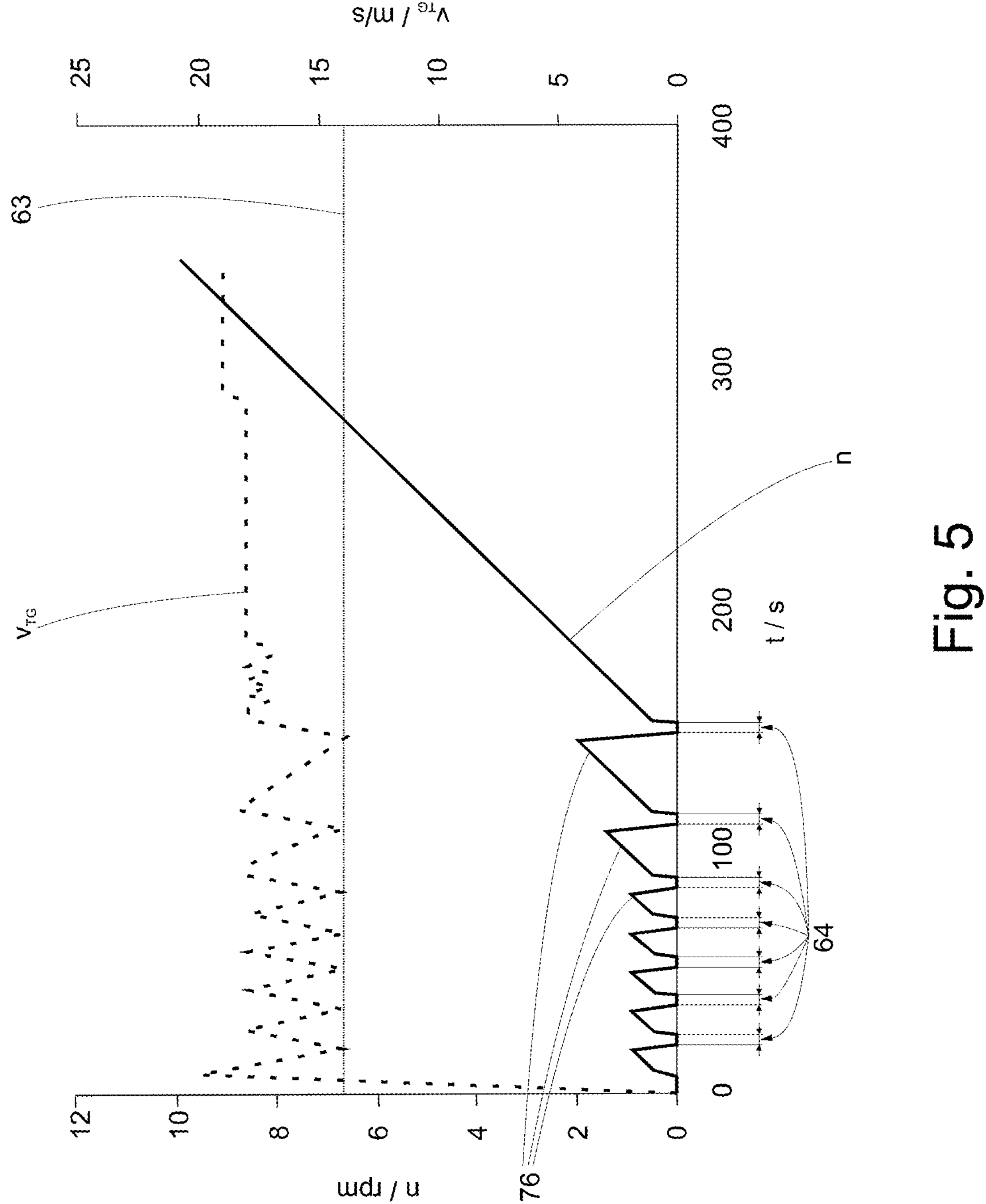

The diagram in FIG. 5 is used to describe an first exemplary method for the open-loop and/or closed-loop control of the agitator drive unit 14.

In the diagram, on the one hand, the speed n of the agitator drive unit 14 in revolutions per minute, and thus also of the agitator rotor 62, is plotted over time in seconds, and on the other hand, the flow velocity $v_{TG}$ of the transfer gas in meters per second is plotted over time in seconds.

When the granulate transfer process is started, a threshold value 63 for a flow velocity $v_{TG}$ of the transfer gas TG is stored as a physical parameter in the control device 7. In the embodiment, the threshold value 63 for the flow velocity $v_{TG}$ of the transfer gas TG is set to 14 m/s. A flow monitor is used for the measuring device 54 designed as meter 56, which supplies a Boolean signal, i.e. indicates whether the flow rate $v_{TG}$ of the transfer gas TG is greater than or less than the threshold 63. In the embodiment shown, for example, the flow sensor SI5000 from ifm electronic gmbh.

For an automated process, the agitator drive unit 14 continuously increases its speed n, because a high speed n of the agitator drive unit 14 is necessary for the granulator 2 to be completely emptied in a batch. When the flow rate $v_{TG}$ of the transfer gas TG falls below the threshold 63, the agitator drive unit 14 is stopped so that no more granules are conveyed into the granulate chamber 22. Subsequently, a defined interruption time 64 is waited for before the granulate transfer process is restarted, i.e. the agitator drive unit 14. It can be seen that the speed n of the agitator drive unit 14 comprises a saw-tooth-like course over time and that the flow velocity $v_{TG}$ forms a zigzag course after an first start-up up to a maximum flow velocity $v_{TG}$ of about 19 m/s. These courses over time can be explained by the granules conveyed into the granulate chamber 23.

As long as no granules are conveyed from the granulator 2 into the granulate chamber 23 of the screening device 3, the flow velocity $v_{TG}$ of the transfer gas TG increases up to a maximum speed. As soon as the granules are conveyed from the granulator 2 into the granulate chamber 23 of the screening device 3 by starting the agitator drive unit 14, the flow rate $v_{TG}$ of the transfer gas TG decreases due to the increasing pressure loss on the transfer gas conveyor path 52. When the flow rate $v_{TG}$ of the transfer gas TG falls below the threshold 63, the agitator drive unit 14 is stopped so that no more granules are conveyed into the granulate chamber 22. The screened granules located on the transfer gas conveyor path 52 are conveyed by the transfer gas TG into the processing apparatus 4. As soon as the pressure drop decreases, i.e. as soon as there are fewer and fewer screened granules on the transfer gas conveyor path 52, the flow rate $v_{TG}$ of the transfer gas TG increases again. When the interruption time 64 has elapsed, the time sequence of the steps is repeated. Therefore, as time passes, the granulator 2 is completely emptied, so that the speed n of the agitator drive unit 14 increases more steeply up to a maximum value, see the last three saw-tooth-like cycles 76 of the speed n. At the same time, the flow rate $v_{TG}$ of the transfer gas TG also increases until a maximum value is reached. By evaluating the two values for the flow rate $v_{TG}$ and the speed n of the agitator drive unit 14, it is possible to determine when the granulator 2 is empty.

After the granulate transfer process, the screened granules conveyed into the processing apparatus 4 are processed in it and another batch of granules is produced in the granulator 2.

The detection of the physical parameter of the transfer gas selected from the group consisting of flow rate, mass flow rate and flow velocity $v_{TG}$, in particular, however, the flow velocity $v_{TG}$, thus prevents the transfer gas conveyor path from becoming at least partially clogged during the granulate transfer process.

Figure 6:
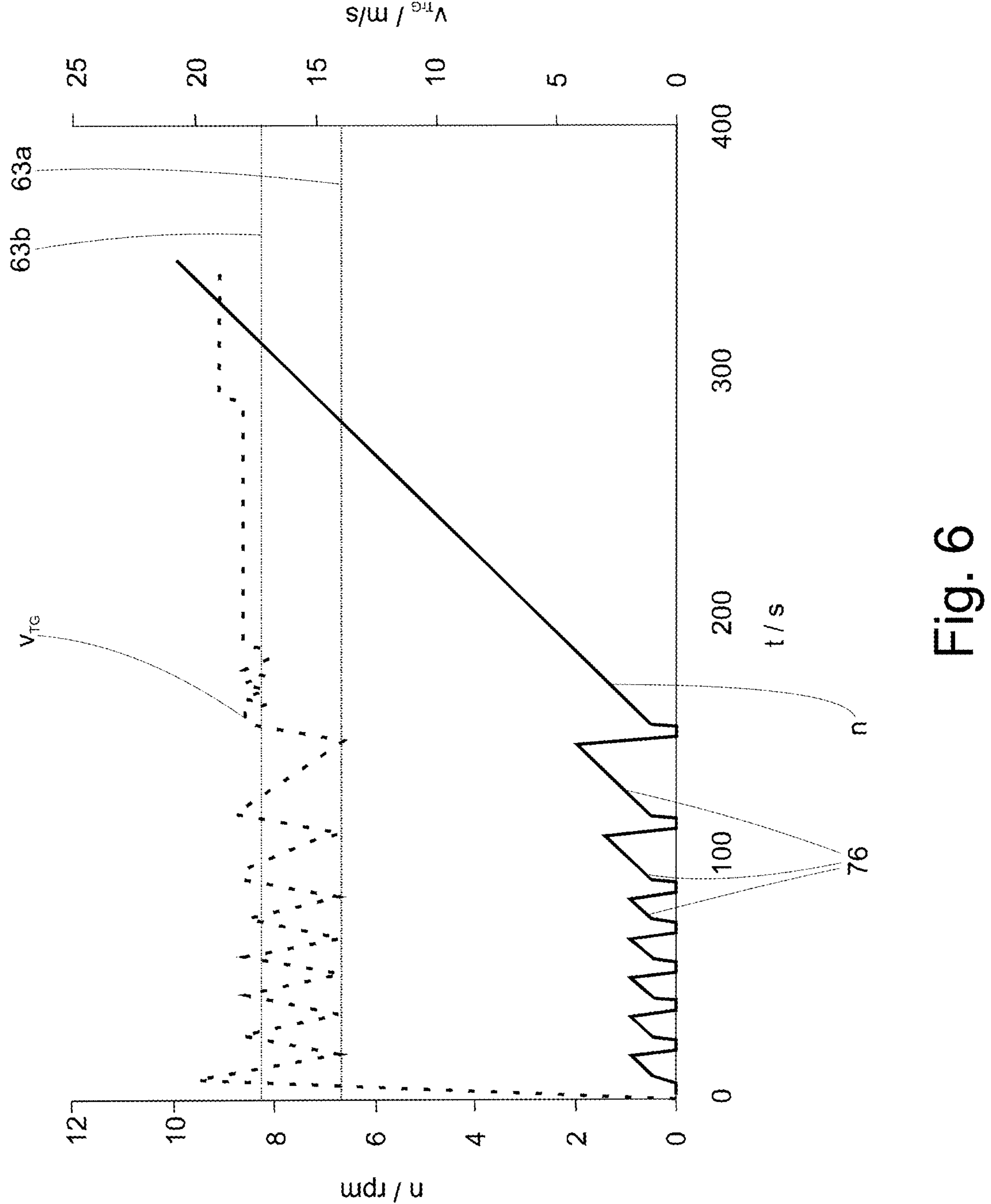

The diagram in FIG. 6 describes a second exemplary method for open-loop and/or closed-loop control of the agitator drive unit 14. In addition to the amendments set out below, the method according to FIG. 6 corresponds to the method according to FIG. 5.

In the diagram in FIG. 6, the agitator drive unit 14 is also stopped by the control device 7 after falling below the first threshold 63*a*, which corresponds to the threshold 63 in the diagram in FIG. 5. In differentiation from the method explained in FIG. 5, in FIG. 6, after the agitator drive unit 14 has been stopped, no interruption time 64 is waited for, but the agitator drive unit 14 is started again when the flow velocity $v_{TG}$, as a physical parameter, exceeds a second threshold value 63*b*. The flow rate $v_{TG}$ is set to about 17.5 m/s for the second threshold. After exceeding the threshold 63*b*, the speed n of the agitator drive unit 14 increases continuously, thereby conveying granules from the granulator 2 into the granulate chamber 22 of the screening device 3. Due to the granules, which clogs both the screen and the granulate transfer line 6, causing a corresponding pressure loss, the flow rate $v_{TG}$ decreases again until the flow rate $v_{TG}$ of the transfer gas drops below the first threshold value 63*a* again. The sequence of steps is repeated until the granulator 2 is emptied.

The embodiments shown in FIGS. 1 and 3 are operated in batches and the embodiment of FIG. 4 is operated quasi-continuously.

The invention claimed is:

1. A granulate production device, comprising:

a granulator comprising an agitator driven by an agitator drive unit, which granulator has at least one granulator inlet for feeding the raw materials, a screening device connected to the granulator via a granulate feed line, which screening device comprises a screen chamber confined by a screen housing, which screen chamber is subdivided by a screen into a granulate chamber for receiving the granules discharged from the granulator and a screen product chamber for receiving the screened granules, the screen product chamber being connected to a transfer gas feed line comprising a feed line inlet, and a processing apparatus which is connected to the screen product chamber of the screening device via a granulate transfer line comprising a transfer line outlet and which comprises a processing chamber through which a process gas conveyed by a conveyor device arrangement can flow on a processing path from a processing chamber to a processing chamber outlet, wherein a transfer gas can be conveyed by the conveyor device arrangement on a transfer gas conveyor path extending from the feed line inlet to the transfer line outlet, which is further suitable for conveying the screened granules by means of the transfer gas via the granulate transfer line from the screen product chamber of the screening device into the processing chamber of the processing apparatus, wherein the granulate production device further comprises a measuring device which is suitable for detecting a physical parameter of the transfer gas selected from the group consisting of flow rate, mass flow and flow velocity on the transfer gas conveyor path, wherein the granulate production device further comprises a control device which comprises a closed loop control functionality and which, taking into account the detected physical parameter of the transfer gas, open-loop and/or closed-loop controls the granulator, wherein the control device is configured to carry out a comparison with a first threshold value stored in the control device for the physical parameter during processing of the detected physical parameter of the transfer gas in order to open-loop and/or closed-loop control the granulator, and wherein the control device is configured to send an open-loop and/or closed-loop signal to the agitator drive unit and/or a granulator outlet closing device in order to set a speed of the agitator drive unit and/or to open or close the granulator outlet closing device.

2. The granulation production device according to claim 1, wherein the measuring device comprises a meter for detecting the physical parameter of the transfer gas at the transfer gas conveyor path, arranged at a transfer gas conveyor line portion associated with the transfer gas feed line.

3. The granulate production device according to claim 2, wherein the meter is a thermal mass flow meter, a Coriolis flow meter, an electromagnetic flow meter, an ultrasonic flow meter, a vortex meter, a differential pressure meter, or a flow monitor.

4. The granulation production device according to claim 1, wherein the agitator drive unit comprises a constant drive torque over its speed range.

5. The granulation production device according to claim 1, wherein a rotor disc is arranged in the screen product chamber of the screening device, which is drivable via a rotor disc drive unit designed as a motor.

6. The granulation production device according to claim 1, wherein the transfer gas feed line is arranged tangentially on a sidewall of the screen housing.

7. The granulate production device according to claim 1, wherein the granulate transfer line is arranged tangentially on a sidewall of the screen housing.

8. The granulate production device according to claim 1, wherein the granulate transfer line is arranged above the transfer gas feed line on the screen housing.

9. The granulate production device according to claim 1, wherein the transfer gas feed line is connected to a process gas feed line so that process gas can be used as transfer gas.

10. The granulate production device according to claim 1, wherein the conveyor device arrangement comprises a process gas conveyor device and/or a transfer gas conveyor device.

11. The granulate production device according to claim 1, wherein the granulate production device comprises a plurality of processing apparatuses and a plurality of granulate transfer lines, each processing apparatus being connected to the screening device by means of a granulate transfer line in order to achieve a quasi-continuous granulate production process.

12. A method for open-loop and/or closed-loop control of a granulate production device, having a granulator comprising an agitator driven by an agitator drive unit, which granulator has at least one granulator inlet for feeding the raw materials, having a screening device connected to the granulator via a granulate feed line, which screening device comprises a screen chamber confined by a screen housing, which screen chamber is subdivided by a screen into a granulate chamber for receiving the granules discharged from the granulator and a screen product chamber for receiving the screened granules, the screen product chamber being connected to a transfer gas feed line comprising a feed line inlet, and with a processing apparatus which is connected to the screen product chamber of the screening device via a granulate transfer line comprising a transfer line outlet and which comprises a processing chamber through which a process gas conveyed by a conveyor device arrangement flows on a processing path from a processing chamber to a processing chamber outlet, and wherein a transfer gas is conveyed by the conveyor device arrangement on a transfer gas conveyor path extending from the feed line inlet to the transfer line outlet, which is further suitable for conveying the screened granules by means of the transfer gas via the granulate transfer line from the screen product chamber of the screening device into the processing chamber of the processing apparatus, wherein the granulate production device comprises a measuring device which, during a granulate transfer process, detects a physical parameter of the transfer gas selected from the group consisting of flow rate, mass flow and flow velocity on the transfer gas conveyor path, wherein the granulate production device further comprises a control device comprising a closed loop control functionality, to which the detected physical parameter is forwarded for further processing during the granulate transfer process, and wherein the control device carries out a comparison with a first threshold value stored in the control device for the physical parameter during the further processing of the detected physical parameter of the transfer gas in order to open-loop and/or closed-loop control the granulate production device wherein the control device sends an open-loop and/or closed-loop signal to the agitator drive unit and/or granulator outlet closing device in order to set a speed of the agitator drive unit and/or to open or close the granulator outlet closing device.

13. The method according to claim 12, wherein the control device comprises an evaluation device which, taking into account the detected physical parameter of the transfer gas, carries out further processing of the detected physical parameter of the transfer gas.

14. The method according to claim 12, wherein the processing apparatus comprises an apparatus inlet closing device, the control device open-loop and/or closed-loop controls the apparatus inlet closing device before the granulate transfer process, so that the latter is moved from a closing position into an opening position.

15. The method according to claim 12, wherein the processing apparatus comprises a process gas feed line in which a process gas flow control device is arranged, the control device open-loop and/or closed-loop controls the process gas flow control device before and/or during the granulate transfer process, so that a vacuum is formed on the transfer gas conveyor path for conveying the screened granules from the screen product chamber into the processing apparatus.

16. The method according to claim 12, wherein upon falling below the first threshold value for the transport gas, the agitator drive unit is stopped and/or a granulator outlet closing device is closed.

17. The method according to claim 16, wherein during the further processing of the detected physical parameter of the transfer gas, the control device carries out a comparison with a second threshold value for the physical parameter stored in the control device, wherein, upon exceeding a second threshold value for the transfer gas, the agitator drive unit is started and/or a granulator outlet closing device is opened.

18. The method according to claim 16, wherein an interruption time is stored in the control device, and after the expiry of this interruption time the agitator drive unit is started and/or a granulator outlet closing device is opened.

19. The method according to claim 12, wherein the granulation production device comprises a plurality of processing apparatuses and a plurality of granulate transfer lines, each processing apparatus being connected to the screening device by means of a granulate transfer line in order to carry out a quasi-continuous granulate production process.

* * * * *